UNITED STATES PATENT OFFICE.

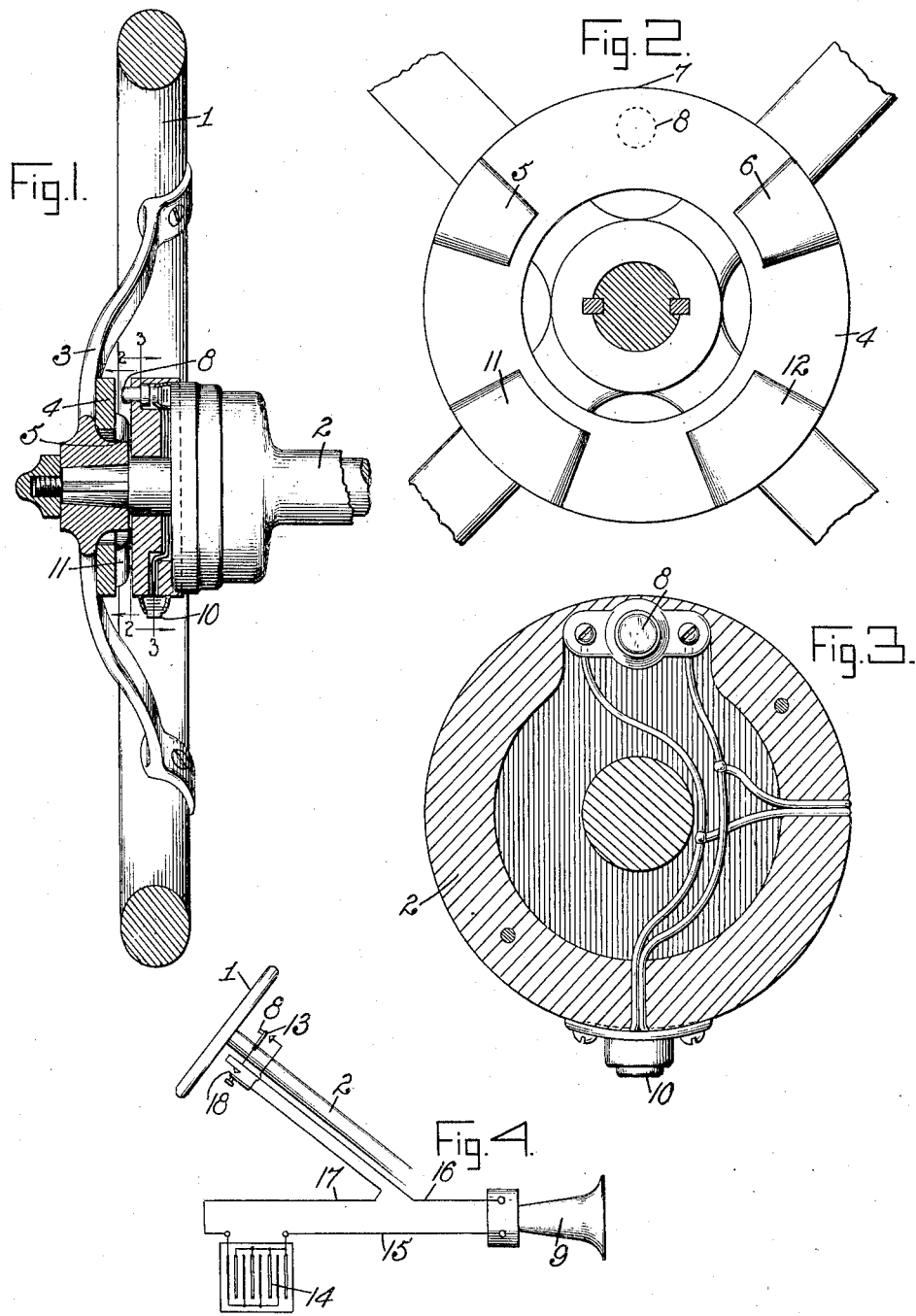

WILLIAM F. EGELHOFER, OF NEW YORK, N. Y.

SIGNAL.

1,248,469.

Specification of Letters Patent.

Patented Dec. 4, 1917.

Application filed August 10, 1916. Serial No. 114,141.

*To all whom it may concern:*

Be it known that I, WILLIAM F. EGELHOFER, a citizen of the United States, and a resident of the city of New York, borough of Queens, in the county of Queens and State of New York, have invented a new and Improved Signal, of which the following is a full, clear, and exact description.

This invention relates to signaling devices for automobiles or other vehicles and has for an object the provision of an improved arrangement whereby when the steering device is moved beyond a predetermined extent a signal will be sounded.

Another object is to provide a signaling device associated with the steering mechanism of an automobile or other vehicle whereby an appreciable turn of the steering device will cause a signal to be sounded and a greater turn will cause the signal to be repeated and prolonged.

A still further object of the invention is to provide a signal for automobiles and other vehicles in which a signal may be sounded at any time manually and in which the same signal may be sounded automatically upon the turning of the steering mechanism beyond a certain extent.

In the accompanying drawings:—

Figure 1 is a longitudinal vertical section through the steering wheel of an automobile showing an embodiment of the invention applied thereto.

Fig. 2 is a section through Fig. 1 on line 2—2, the same being on an enlarged scale.

Fig. 3 is a section through Fig. 1 on line 3—3, the same being on an enlarged scale.

Fig. 4 is a diagram showing the connections of the signaling device, switches and source of current.

Referring to the accompanying drawing by numerals, 1 indicates a steering wheel of any usual or preferred structure, the particular form thereof and of the steering post 2 not forming any part of the present invention except in combination with the parts hereinafter described. Connected to the spider 3 of the wheel 1 is a plate 4, which plate is provided with raised cam surfaces 5 and 6 spaced an equal distance apart from the central line 7, which line is directly above the button 8 which closes a switch hereinafter described included in the circuit of the horn 9, whereby said horn will be sounded when said button 8 is depressed. The width of the cams 5 and 6 is preferably small so that the sound is not very prolonged unless the wheel is maintained in a correctly turned position to hold the button in a depressed state.

The cam members 5 and 6 usually operate the button 8 when the wheel is being turned for steering the automobile around another vehicle. In ordinary steering along a public right-of-way the space between the cams 5 and 6 will allow the wheels to be turned to quite an extent for steering purposes without sounding the horn. If it should be desired to sound the horn or other signal when going straight ahead the operator may press the manually actuated button 10 which will close the circuit of horn 9 and produce the sound desired. In case the automobile is turning around a corner or is caused to make some other large turning movement the wheel 1 is rotated until either of the cams 11 or 12 is caused to engage button 8 for depressing the same. When this is done the button 8 is first depressed by one of the cams 5 or 6, and on a continued movement of the wheel 1 the cams 11 and 12 come into action and by reason of their width hold the button 8 down for almost the full turning movement. Preferably the button 10 is arranged at the rear of the steering post 2 or next to the driver, while button 8 is arranged in a diametrically opposite position.

As shown in Fig. 4, when the button 8 is depressed the switch 13 is closed and, consequently, current may pass from battery 14 through wires 15, 16 and 17. As button 10 is connected through the same circuit to the switch 18 the horn 9 will be operated by a current from battery 14 whenever button 10 is closed manually. By this construction and arrangement the signal device, as for instance, horn 9, may be sounded at any time and for any length of time by a manual operation of button 10 without moving the hand an appreciable distance from the wheel 1, and the signal is also sounded upon an appreciable turning which takes place at any time. In case it should, for any reason, be undesirable to use the automatic structure, button 8 may be removed and the parts will then operate as if this structure was not provided.

What I claim is:

1. In a circuit controlling device for vehicle signals, the combination with a steering post and a steering wheel, of a switch carried by said post, a button on said post for operating said switch, a rotatable member connected to said steering wheel, and a pair of cams arranged on said rotatable member on each side of said button, the cams nearest to the button being narrower than the remaining cams whereby as said wheel is turned the button is depressed for closing the switch a short time and then a longer time.

2. In a circuit controlling device for vehicle signals, the combination with a steering post and a steering wheel, of a switch arranged on said steering post, a rotatable member arranged on said steering wheel so as to rotate therewith, and a pair of cams arranged on said rotatable member on each side of said switch, said cams being adapted to operate said switch as they pass thereover, the cams nearest to the switch being narrower than the remaining cams whereby as said wheel is turned the switch is closed a short time and then a longer time.

WILLIAM F. EGELHOFER.